United States Patent
Hernacki et al.

(10) Patent No.: US 8,561,181 B1
(45) Date of Patent: Oct. 15, 2013

(54) DETECTING MAN-IN-THE-MIDDLE ATTACKS VIA SECURITY TRANSITIONS

(75) Inventors: Brian Hernacki, San Carlos, CA (US); William E. Sobel, Stevenson Ranch, CA (US)

(73) Assignee: Symantec Corporation, Cupertino, CA (US)

( * ) Notice: Subject to any disclaimer, the term of this patent is extended or adjusted under 35 U.S.C. 154(b) by 1100 days.

(21) Appl. No.: 12/324,820

(22) Filed: Nov. 26, 2008

(51) Int. Cl.
*G06F 11/00* (2006.01)
*G06F 12/14* (2006.01)
*G06F 12/16* (2006.01)
*G08B 13/00* (2006.01)

(52) U.S. Cl.
USPC .................................. 726/22; 726/1; 726/26

(58) Field of Classification Search
USPC .................. 726/1, 22–26; 709/223, 227, 228
See application file for complete search history.

(56) References Cited

U.S. PATENT DOCUMENTS

| | | | |
|---|---|---|---|
| 7,571,459 B2 * | 8/2009 | Ganesh et al. | 726/1 |
| 7,865,953 B1 * | 1/2011 | Hsieh et al. | 726/22 |
| 8,001,599 B2 * | 8/2011 | McBrearty et al. | 726/22 |
| 8,056,128 B1 * | 11/2011 | Dingle et al. | 726/22 |
| 8,205,255 B2 * | 6/2012 | Benea et al. | 726/22 |
| 2005/0149726 A1 * | 7/2005 | Joshi et al. | 713/164 |
| 2008/0147837 A1 * | 6/2008 | Klein et al. | 709/223 |

* cited by examiner

*Primary Examiner* — Linglan Edwards
*Assistant Examiner* — Daniel Potratz
(74) *Attorney, Agent, or Firm* — Fenwick & West LLP

(57) ABSTRACT

A page list comprising a list of transitions between network resources is established. Subsequently, a transition is detected between a first network resource and a second network resource. An expected security level associated with the transition is identified based on the page list. Responsive to the detected security level being determined to be lower than the expected security level, a remedial action is performed.

20 Claims, 5 Drawing Sheets

DETECTING MAN-IN-THE-MIDDLE ATTACKS VIA SECURITY TRANSITIONS

BACKGROUND OF THE INVENTION

1. Field of the Invention

This invention pertains in general to computer security and in particular to detection of man-in-the-middle attacks by analysis of changes in security levels during transitions between network resources.

2. Description of the Related Art

Modern computer systems are often susceptible to a number of different problems, problems which are exacerbated by the increasing complexity of computer systems. One such problem relates to system security, and in particular to "man-in-the-middle" attacks, in which a malicious third party (hereinafter "attacker") eavesdrops on electronic communications between two parties, intercepting the communications and injecting new substitute communications. Such attacks can arise in a variety of contexts, such as in a wireless communications network, where the attacker places a wireless "hotspot" near a legitimate hotspot, leading a user to unwittingly route data through the hotspot of the attacker. The attacker can then copy and modify the data communicated between the two parties.

In one form of man-in-the-middle attack, the attacker intercepts a web page sent from a server to a client, lowering the security level by replacing links to uniform resource locators (URLs) that specify the use of HTTPS with links that specify unsecure HTTP. For example, a user might begin at the initial, unsecure web page of a web site (e.g., a web page using HTTP), which contains a link leading to a login page and specifying that the login page uses HTTPS. However, since the initial page uses HTTP and is consequently unsecure, the attacker can intercept the initial web page and replace the link to the login page with a link that specifies HTTP rather than HTTPS. For example, the attacker could change a link of the form https://signin.site.com/action?SignIn to http://signin.site.com/action?SignIn. Thus, when the user clicks the login link, it will lead to an unsecure but functional login page using HTTP, and the user's login information will therefore be visible to the attacker, unbeknownst to the user.

BRIEF SUMMARY

The difficulties described above are addressed by a computer, method, and computer program product that use a page list to determine whether or not a given transition between two network resources, such as web pages, has at least an expected level of security associated with it. If not, then an appropriate response is taken, such as displaying an alert noting the possibility of a man-in-the-middle attack or other security violation.

One embodiment of the method establishes a page list comprising a list of transitions between network resources. A transition is detected between a first network resource and a second network resource in a browser associated with the client computer. A security level associated with the transition from the first network resource to the second network resource is additionally detected. The method further identifies an expected security level associated with the transition based on the page list, determines whether the detected security level is lower than the expected security level, performing a remedial action if so.

Embodiments of the computer-readable storage medium store a computer program executable by a processor for detecting a possible network security breach occurring during a network interaction involving a client computer. The actions of the computer program comprise establishing a page list comprising a list of transitions between network resources. The actions of the computer program further comprise detecting a transition from a first network resource to a second network resource in a browser associated with the client computer, detecting a security level associated with the transition from the first network resource to the second network resource, and identifying an expected security level associated with the transition based on the page list. The actions of the computer program further comprise determining whether the detected security level is lower than the expected security level, and, responsive to the detected security level being lower than the expected security level, performing a remedial action.

A computer-implemented system for detecting a possible network security breach occurring during a network interaction involving a client computer comprises a cache containing a page list comprising a list of transitions between network resources. The system further comprises a security module performing actions comprising detecting a transition from a first network resource to a second network resource in a browser associated with the client computer, detecting a security level associated with the transition from the first network resource to the second network resource, and identifying an expected security level associated with the transition based on the page list. The actions further comprise determining whether the detected security level is lower than the expected security level, and, responsive to the detected security level being lower than the expected security level, performing a remedial action.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
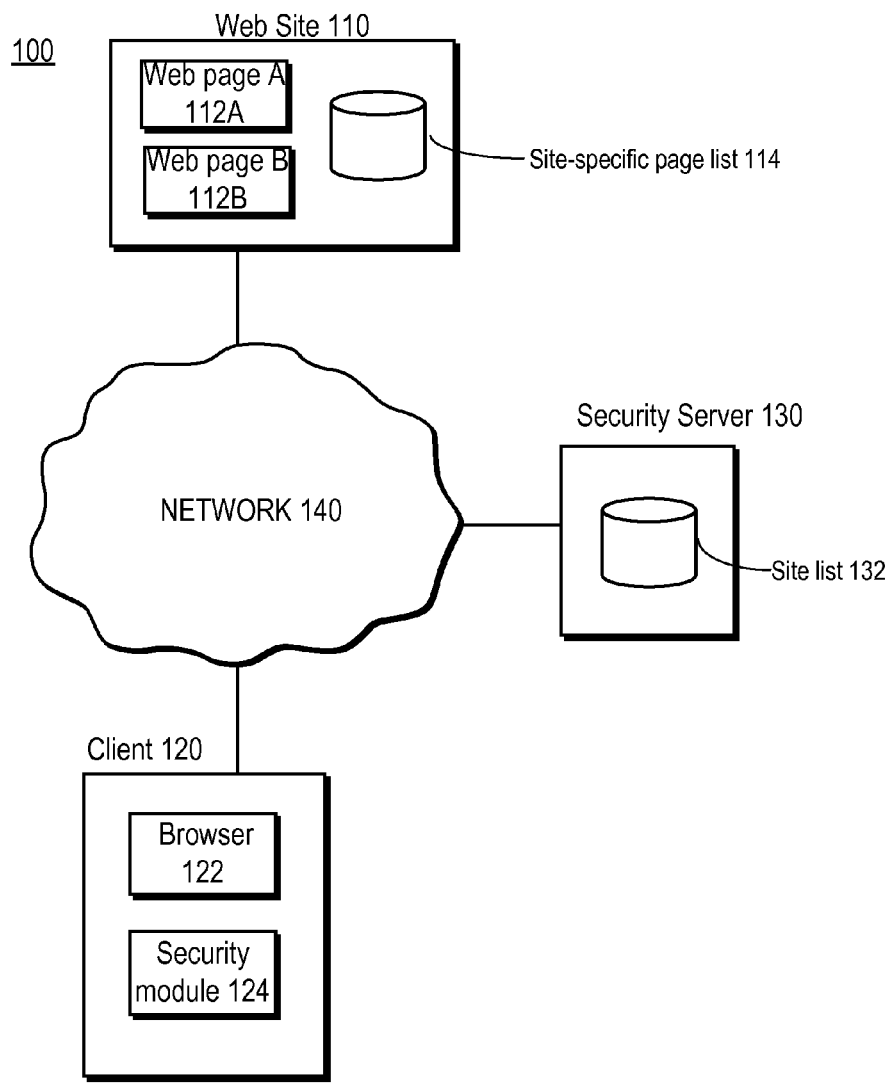
FIG. 1 is a high-level block diagram of a computing environment according to one embodiment.

FIG. 1 is a high-level block diagram of a computing environment 100 according to one embodiment. FIG. 1 illustrates a web site 110 and a client 120 connected by a network 140. Only one client 120, one web site 110, and one security server 130 are shown in FIG. 1 in order to simplify and clarify the description. Embodiments of the computing environment 100 can have thousands or millions of clients 120, web sites 110, and/or security servers 130 connected to the network 140.

In general, the client 120 communicates with the web site 110, transitioning between various locations—e.g., between web pages—on the site 110. The client 120 determines whether the site 110 is intended to be protected, e.g. by consulting a site list 132. If it is, then the client 120 further consults a page list to determine whether the current transition between locations on the site meets the expected level of security. The page list may be created by different entities, and made available at different locations, in different embodiments.

The web site 110 includes a collection of one or more web pages 112 stored on a web server. Depicted in FIG. 1 are a web page A 112A and a web page B 112B, which represent a web page and another web page to which it transitions, respectively. Generally, this change between one network resource (e.g., a web page) associated with a first security level and a second network resource associated with a second, possibly different security level, is hereinafter referred to as a "transition." The first and second network resources are said to be in a directed relationship, since control is directed from the first network resource toward the second network resource. A network security level represents a particular level of security protection associated with a network resource such as a web page. For example, the application-level network protocols HTTPS and HTTP could represent "secure" and "unsecure" security levels, respectively, although it would be equally possible to have multiple security levels orderable according to degrees of security strength. The HTTPS and HTTP indicators can be specified in the HTML code for web page A 112A as part of the protocol for a URL leading to web page B 112B, and when the transition to web page B 112B takes place the security level can be determined by querying the state of a client browser. The security level of interest for a transition between web page A 112A and web page B 112B is that associated with the target web page B 112B. Note that web pages 112 conceptually represent any pair of pages on the web site 110 that have a transition relationship, rather than representing particular pages. The web site 110 and the web pages 112 are identified by their respective uniform resource locators (URLs). The client 120 uses the URLs to download web pages 112 from the site 110 via the network 140. In one embodiment, the web site 110 may optionally provide a site-specific page list 114, which includes data describing transitions specific to the web site 110.

In one embodiment, a client 120 is a computer used by one or more users to perform activities including browsing web sites 110 on the network 140. The client 120 executes a web browser 122 such as MICROSOFT INTERNET EXPLORER or MOZILLA FIREFOX that allows the user to retrieve and display content from web sites 110 and other computers on the network 140. In other embodiments, the client 120 is a network-capable device other than a computer, such as a personal digital assistant (PDA), a mobile telephone, a pager, a television "set-top box," etc.

The client 120 includes a security module 124 for monitoring and protecting the client 120. If the security module 124 detects a transition between web pages 112A and 112B with a security level lower than that which was expected, it performs a remedial action, such as reporting that a man-in-the-middle attack may be underway.

In one embodiment, the security server 130 is a computer used by a security software provider, such as Symantec Corporation of Cupertino, Calif., or other trusted third party to provide and/or create and aggregate security information. The security server 130 has a site list 132 that specifies the various web sites that are being protected. For example, the site list 132 might store a list of domain names listing several hundred financially-oriented sites associated with banks, payment intermediaries, and so forth, e.g. organizations such as BANK OF AMERICA or PAYPAL. Depending on the embodiment, other information may also be associated with various sites on the site list 132. For example, if site-specific page lists are sometimes made available by the various web sites 110, there can be provided data necessary to request the site-specific page list 114 of a site 110, such as a URL from which to obtain the page list, or a port number at which to submit a request for it. In some embodiments, authentication information needed to verify that the site-specific page list is genuine may also be associated with the site. For example, if the web site 110 signs the site-specific page lists, there could be a key to authenticate the signature, or a reference to a key store location storing a key used to do so. If the various site-specific page lists 114 are signed by the security server 130—which should have a well-known key—then it is not necessary to associate keys specific to each web site 110.

The network 140 represents the communication pathways between the web site 110, the client 120, and the security server 130. In one embodiment, the network 140 is the Internet and uses standard communications technologies and/or protocols. Thus, the network 140 can include links using technologies such as Ethernet, 802.11, integrated services digital network (ISDN), digital subscriber line (DSL), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some of links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Figure 2:
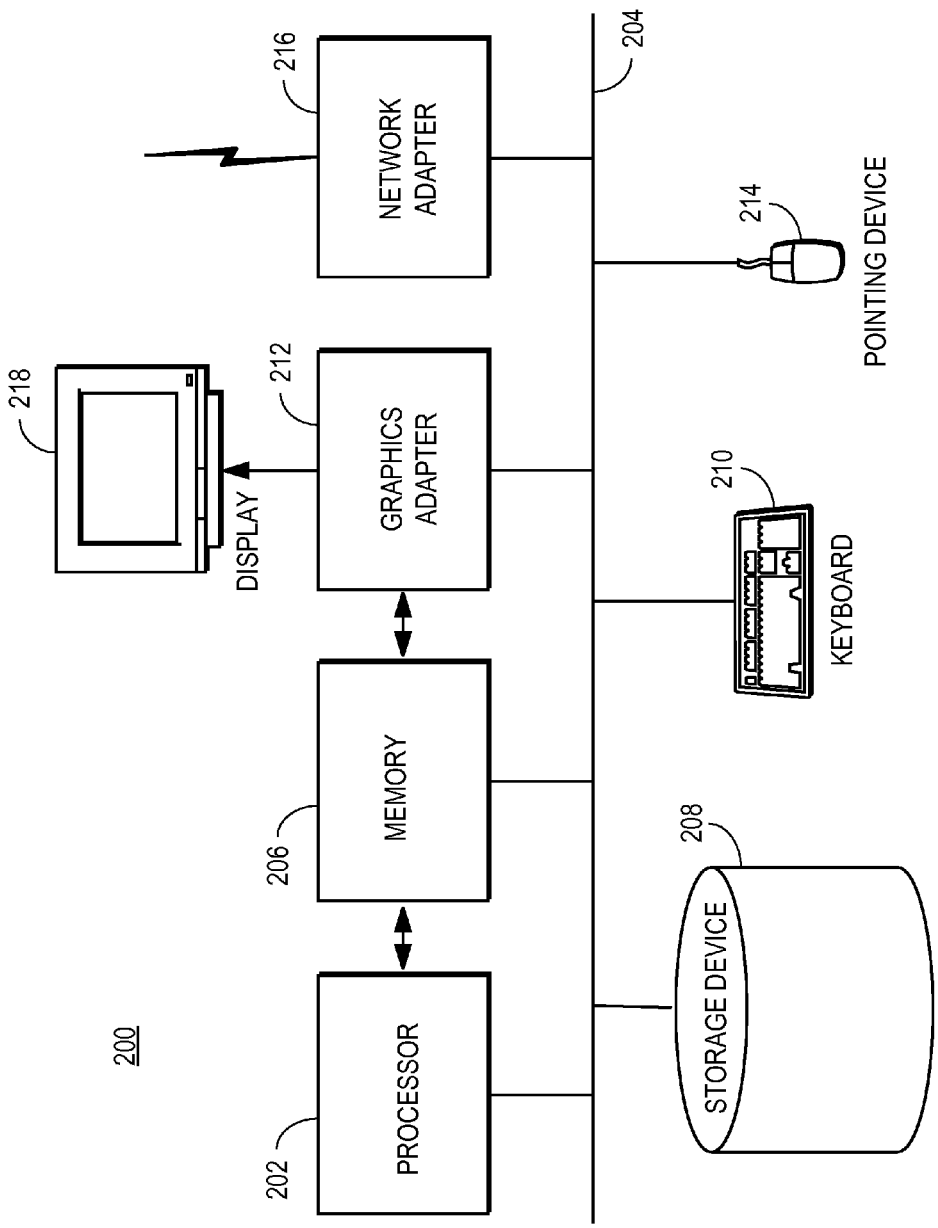
FIG. 2 is a high-level block diagram illustrating a more detailed view of a client or security server according to one embodiment.

FIG. 2 is a high-level block diagram illustrating more detailed view of the client 120 or security server 130 (FIG. 1) according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 140.

The memory 206 may be, for example, firmware, read-only memory (ROM), non-volatile random access memory (NVRAM), and/or RAM, and holds instructions and data used by the processor 202. The memory 206 may be divided into pages by the operating system, each page having attributes such as whether the page is readable, writable, or executable (i.e. contains executable instructions), or whether it was loaded from a file on the storage device 208. In one embodiment, the memory 206 includes RAM that holds instructions and data used by the client 120.

The storage device 208 is a computer-readable storage medium such as a hard disk drive, a writeable compact disk (CD) or DVD, a solid-state memory device, or other form of storage. The storage device 208 stores files and other data structures used by the computer.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

Figure 3:
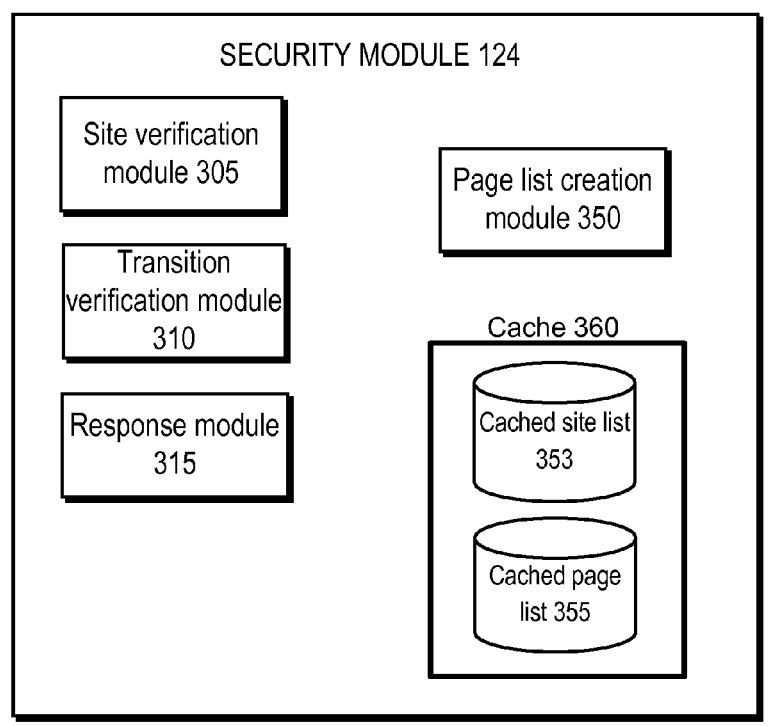
FIG. 3 is a high-level block diagram illustrating a detailed view of the security module of FIG. 1, according to one embodiment.

FIG. 3 is a high-level block diagram illustrating a detailed view of the security module 124 (FIG. 1) according to one embodiment. Generally, an embodiment of the security module 124 monitors network communications, ensures that the transitions between network resources such as web pages have the expected level of security, and takes an action, such as reporting a security level, if the expected level of security is not met. In the embodiment described for purposes of example throughout the below description, the detected transitions are between web pages identified by their respective URLs and associated with a security level. For example, the URL http://www.site.com represents the domain name www.site.com, the introductory site page, and the HTTP protocol, which can be considered an "unsecure" security level. Similarly, the URL https://signin.site.com/action?SignIn represents the domain signin.site.com, the sign-in page associated with the "action?SignIn" path, and the HTTPS protocol, which can be considered to represent a "secure" level. In one embodiment, the security module 124 is implemented as an extension of the browser 122, e.g. a plug-in or browser helper object (BHO), and thus has access to browser context data such as the URLs being accessed and the security protocols being employed.

A site verification module 305 establishes a list of sites to be monitored. In one embodiment, the site verification module 305 establishes the list of sites by obtaining the site list 132 from the security server 130. The site verification module then monitors sites on the site list 132. Since a denial of service attack by a "man in the middle" is possible at this point, if the site verification module 305 does not receive the site list 132 from the security server 130 in response to its request, it notifies a below-described response module 315, which takes a remedial action, such as issuing an alert to a user and blocking web page accesses. If the site verification module 305 does receive a purported site list 132, it authenticates it in order to ensure that it is from the security server 130 and not from some other entity, such as an attacker. Such authentication can be accomplished by the security server 130 signing the site list 132 and the site verification module 305 verifying the signature using public key cryptographic techniques. If the site list 132 is not successfully authenticated, then it can be treated as if it was not obtained at all, and a remedial action taken as noted above.

In one embodiment, the site list 132 may be obtained periodically, e.g. daily, to reflect the addition of further protected sites to the list, or any other changes taking place on the security server 130 since the site verification module 305 last obtained the site list 132. In such an embodiment, the site verification module 305 caches the site list 132 when it is received as a local cached site list 353 within a cache 360, and then monitors the associated sites until an updated site list is obtained. For example, the cached site list 353 can be stored in association with a time stamp indicating when it was last updated, and at the expiration of some desired update period, the site verification module 305 requests a new site list from the security server 130, caching the new site list in association with the current time. The cache 360 could be, for example, part of the memory 206 or the storage device 208 of the client 120, and can contain a cached page list 355. In another embodiment, the security server 130 stores a list of all the site verification modules 305 that have requested a copy of the site list 132, and then sends updates to those verification modules whenever the site list 132 is updated on the security server 130.

With the site list 132 received, the site verification module 305 monitors the network communications taking place between the client 120 and web site 110 via the network 140 and identifies the site with which the client 120 is communicating, e.g. by examining the domain specified by a URL. The site verification module 305 then determines whether or not the site is on the list of protected sites specified by the site list 132. If it is not, then the security module 124 allows the communications with that site to proceed without further analysis, since the site is not intended to be protected. If the site is on the site list 132, however, then the site verification module 305 passes control to a transition verification module 310.

The transition verification module 310 determines whether the particular transition between web pages leads to an expected security state. More specifically, the transition verification module 310 consults a page list 355, which comprises a list of transitions between network locations. For example, in one embodiment the page list 355 comprises ordered pairs of network resources representing a transition and (explicitly or implicitly) expected security levels associated with the transition, such as a list of source and destination web pages where it is expected that the destination page is associated with a given level of security. For instance, one element of such a list could have source page http://www.site.com and destination page https://signin.site.com/action?SignIn from the above example, where it is expected that the transition from the source introductory page to the destination sign-in page will result in using a secure protocol such as HTTPS for the destination page. In one embodiment the page list 355 represents the expected security level for a particular transition as an identifier for the protocol, e.g. the string "https." In other embodiments, the security level is represented by some abstraction created based on the protocol and any other factors contributing to a security level; for example, one such abstraction could be an integer value, where greater values indicate greater levels of security.

Thus, when it observes a transition from one web page A to another web page B, the transition verification module 310 determines whether the page list 355 contains the ordered pair <A, B>. If the page list 355 does not contain the ordered pair, then the transition verification module 310 allows the communications to proceed without further analysis. In another embodiment, if the page list 355 does not contain the ordered pair, then the response module 315 takes an action, such as blocking the transition. If the page list 355 does contain the ordered pair, however, this means that the transition to page B is expected to result in using a secure protocol, such as HTTPS, for communications. The transition verification module 310 therefore consults the browser state to determine the security mode of the requested communication with the page B. If the security mode is not sufficiently secure—e.g., if it uses HTTP rather than the expected HTTPS—then the transition verification module 310 notifies the response module 315, which takes an appropriate action, as described in more detail below.

The page list 355 may be created and made available by different entities in different embodiments. In one embodiment, the page list 355 is created by a page list creation module 350 on the client 120 based on observance of prior page transitions on the client 120. In this embodiment, the page list creation module 350 monitors the pages visited by the browser 122 and the associated security levels, recording a transition and its security levels for future use, where the transition is associated with an increase in a security level of the browser session. For example, the page list creation module 350 could note that transitions between web pages http://www.site.com and https://signin.site.com/action?SignIn always, or usually, result in a change from the HTTP to HTTPS protocols, where the change from the less secure HTTP to the more secure HTTPS represents an increase in the security level of the browser session. In one embodiment, the page list creation module 350 performs this monitoring for some training period, which could be either a fixed length of time (e.g., a week), or a period based on the completion of some event (e.g., the accumulation of a sufficient amount of data), and after the completion of the training period considers the page list 355 as being complete, at which point the transition verification module 310 may use it to verify transition security as described above. In another embodiment, the page list creation module 350 does not create the entire page list 355 at once, but instead works on a per-transition basis, observing a given page transition a specified number of times (e.g., one or more times) before creating an entry for it in the page list 355, at which point the transition verification module 310 may use the page list 355 with respect to that particular transition.

In another embodiment, the local page list 355 is uploaded from each client 120 by the page list creation module 350 to the security server 130, which aggregates the information and applies a threshold to determine which transitions require a given security level. For example, the security server 130 could require that 80% of the observed security levels for aggregated data on a particular page transition involve secure communication before it creates an entry for that transition in an aggregated page list stored on the security server 130. In this variation, the transition verification modules 310 of the clients 120 requests the aggregated page list from the security server 130, rather than relying on their own local page lists 355. As described above with respect to obtaining the site list 132, if the client 120 cannot obtain the aggregated page list from the server 130, or if the aggregated page list is provided but not authenticated as belonging to the security server 130, then the response module 315 could take a remedial action, as later described below.

In another embodiment, the page list 355 is created and made available by the security server 130. In this embodiment, the organization responsible for the security server 130, after having identified the sites to be stored in the site list 132, then analyzes each of these sites, first obtaining a user account if needed, and recording the observed transitions and the associated security settings. For example, this analysis could employ conventional web crawler software, following the links included in the various web pages, and detecting whether the transition used the HTTP or HTTPS protocols. Those transitions leading to HTTPS pages can then be stored within the page list 355 maintained by the security server 130. This approach could alternatively or additionally employ human operation, such as a user intelligently browsing a site and providing any required input to the web site 110, while network monitoring software records the page transitions and their associated security levels. The transition verification module 310 on the clients 120 then requests and subsequently uses the page list 355 from the security server 130.

In still another embodiment, a page list is created by the web site 110 itself and relates to transitions associated with pages from that particular web site 110. The web site 110 may create this site-specific page list 114 in a manner similar to the creation of the page list 355 by the security server 130, e.g. by a crawler whose scope is limited to the web site 110, or by a human operator. When creating the site-specific page list 114, the web site 110 may apply additional information that it has about its own structure and operation, such as a site map generated when the site was published. The web site 110 then makes the site-specific page list 114 available to the transition verification module 310. It can do so by uploading the site-specific page list 114 to the security server 130, which will then aggregate it with other site-specific page lists of other web sites and with any page list information created by the security server 130 itself. Alternatively, the site-specific page list 114 can be made available from the web site 110 itself.

In this embodiment, if the site verification module 305 determines that the site 110 with which communications are currently occurring is on the site list 132, and if source data associated with the site 110 in the site list 132 specifies that the site 110 provides its own site-specific page list 114, then the transition verification module 310 will request the site-specific page list 114 or a portion thereof from the web site 110, again optionally employing authentication to ensure that the page list 114 is indeed from the web site 110 rather than being submitted by an attacker. The transition verification module 310 can use the received page list 114 or portion thereof merely to verify the current page transition, or it can cache it for future use in the cache 360, optionally with a cache expiration time, as described above.

In one embodiment, these different approaches to creating and providing the page list 355 may be combined. For example, the page list creation module 350 could create the local page list 355 stored by the security module 124 of the client 120, as described above, and use it where there is an entry for a transition in the page list 355, but request additional data from the security server 130 where the page list 355 lacks an entry for a given transition.

The security module 124 additionally comprises the response module 315, which performs a remedial action in response to a failure to verify that a current page transition at the web site 110 has the expected security level. As noted above, such a failure could be, for example, a failure to obtain the requested site list 132, page list 355, or site-specific page list 114, a failure to authenticate the list even if received, or a transition security level lower than that specified in the applicable page list as expected when transitioning from web page 112A to web page 112B. The remedial action of the response module 315 could be, for example, to block the communication with the target web page 112B. The remedial action could additionally or alternatively be to issue an alert such as a displayed dialog box warning a user that a security breach may be being attempted, or to display a status flag in the browser 122 noting that certain data was blocked for security reasons. The remedial action might also be to send a report, e.g. a message describing the failure or summarizing the failure and other related failures, to the client 110 or to the security server 130 over the network 140, which could log the report for future analysis.

Figure 4:
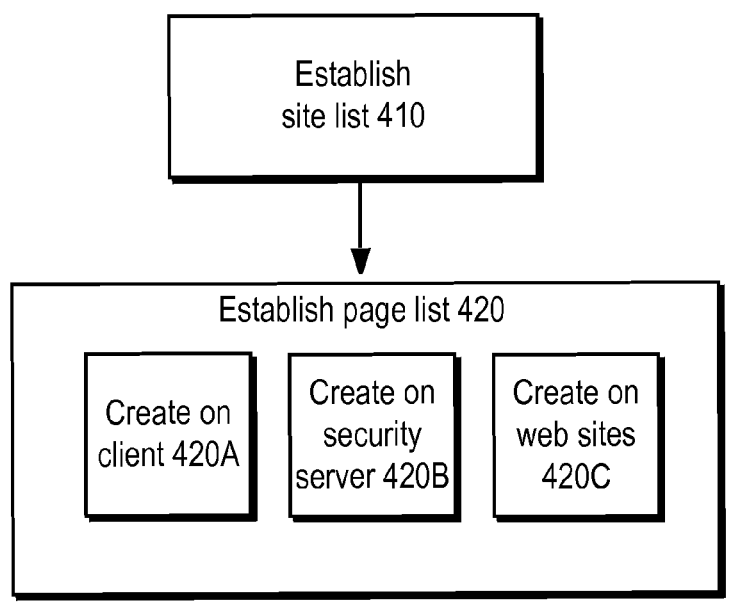
FIG. 4 is a flowchart illustrating steps for establishing site and page lists, according to one embodiment.

FIG. 4 is a flowchart illustrating steps for establishing site and page lists, according to one embodiment. First, the site list 132 is established 410. In one embodiment, this is accomplished by creating the site list 132 on the security server 130, which involves those responsible for the security server 130 specifying which sites they wish to be protected, such as well-known financial sites.

The page list 355 or site-specific page lists 114 are also established 420 in different ways according to different embodiments, as previously discussed. For example, the page list 355 can be created 420A entirely on the client 120 by the client's page list creation module 350, which detects transitions performed on the client 120 and their associated security levels. Alternatively, the page list 355 can be created 420B on the security server 130 by automated crawling and/or human browsing of the sites on the site list 132. Or, site-specific page lists can be created 420C by the individual web sites 110. The page lists can be made available to the client in a number of ways in different embodiments, as well. For example, the page list data created by the page list creation module 350 on the client 120 can be stored on the client 120, or aggregated on and made available from the security server 130. Similarly, partial page lists 114 created by the web sites 110 can be made available from the web sites 110, or aggregated on and made available from the security server 130.

The particular apportionment of the functionality of the security module 124 can be differently divided among modules in other embodiments. For example, the functionality of the transition verification module 310 and the response module 315 might be implemented within a single module.

Figure 5:
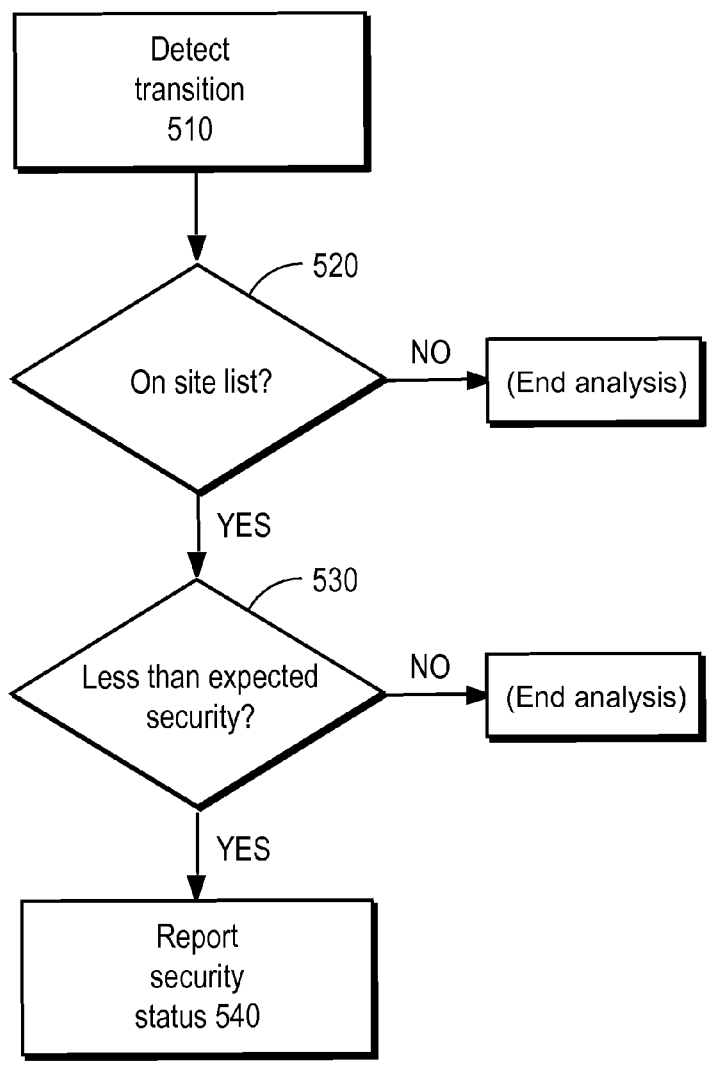
FIG. 5 is a flowchart illustrating steps for using the security module to detect transitions and respond to potential security attacks, according to one embodiment.

FIG. 5 is a flowchart illustrating steps for using the security module 124 on the client 120 to detect transitions and respond to potential security attacks at the client, according to one embodiment. At step 510, the security module 124 detects a transition between a first page and a second page on a site, and the security level associated with the subsequent page, such as values denoting "unsecure" or "secure" and corresponding to the HTTP and HTTPS protocols, respectively. The security module 124 consults 520 the site list 132, which as described above can be cached on the client 120 after the most recent copy thereof was received from the server. If the site corresponding to the page transitions is on the site list 132, then the site is intended to be protected and thus the analysis continues to step 530. If not, it is not intended to be protected, and the analysis terminates.

At step 530, the security module 124 consults data from the page list 355 or site-specific page list 114 to determine the security level expected to be associated with the page transition that was just detected. Then, this security expected level is compared to the actual security level of the transition just detected. If the actual security level is at least as high as the expected security level, then no danger is detected and the analysis ends. If, however, the actual security level is less than that expected, e.g. if a security level corresponding to the use of HTTPS was expected but only HTTP is actually being used, then the security module 124 considers that there is a possible security breach taking place, e.g. a man-in-the-middle attack, and proceeds to step 540. At step 540, the security module 124 takes a remedial action such as reporting the security level, e.g. noting that the security level associated with the page transition was less than expected, or the other actions described above with respect to the response module 315.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of detecting a possible network security breach occurring during a network interaction involving a client computer, the method comprising:
    establishing a page list comprising, for each of a plurality of transitions from a source web page to a destination web page, an identifier of the source web page, an identifier of the destination web page, and a representation of an expected security level associated with the transition;
    detecting a transition from a first web page to a second web page within a browser associated with the client computer;
    responsive to detecting the transition from the first web page to the second web page, identifying a site that comprises the first web page and the second web page in a site list comprising a list of sites to be protected;
    detecting a security level associated with the transition from the first web page to the second web page;
    responsive to identifying the site in the site list, identifying an expected security level associated with the transition from the first web page to the second web page using the page list;
    determining whether the detected security level is lower than the identified expected security level; and
    responsive to the identified detected security level being lower than the identified expected security level, performing a remedial action.

2. The computer-implemented method of claim 1, wherein the page list further comprises authentication data associated with a site in the site list, the method further comprising verifying that the page list came from an expected source by applying the authentication data to the page list.

3. The computer-implemented method of claim 1, wherein establishing the page list comprises receiving a first page list from a first web site associated with the first web page and the second web page, and receiving a second page list from a second web site, wherein the first and second page lists comprise, for at least one transition from a source web page to a destination web page, an identifier of the source web page, an identifier of the destination web page, and an expected security level associated with the transition.

4. The computer-implemented method of claim 1, further comprising receiving the page list from a security server located at a remote location over a computer network.

5. The computer-implemented method of claim 1, further comprising:
    monitoring transitions between first and second web pages within the browser associated with the client computer;
    determining whether a first one of the transitions is associated with an increase in a security level of a browser session; and
    responsive to a determination that the first one of the transitions is associated with an increase in the security level, storing the first one of the transitions and a representation of the security level in the page list.

6. The computer-implemented method of claim 5, further comprising:
    providing the page list to a security server; and
    receiving, from the security server, an aggregated page list comprising contents of the page list and contents of page lists created on computers other than the client computer.

7. The computer-implemented method of claim 1, wherein the remedial action comprises one of blocking access to the second web page, displaying an alert message referencing the detected and expected security levels, and logging an error message referencing the detected and expected security levels.

8. The computer-implemented method of claim 1, wherein the expected security level associated with the transition corresponds to a use on the second web page of one of the Hypertext Transport Protocol (HTTP) and Secure HTTP (HTTPS) protocols, and wherein determining whether the detected security level is lower than the identified expected security level comprises determining whether the detected security level involves HTTP rather than HTTPS.

9. A non-transitory computer-readable storage medium storing a computer program executable by a processor for detecting a possible network security breach occurring during a network interaction involving a client computer, actions of the computer program comprising:
   establishing a page list comprising, for each of a plurality of transitions from a source web page to a destination web page, an identifier of the source web page, an identifier of the destination web page, and a representation of an expected security level associated with the transition;
   detecting a transition from a first web page to a second web page within a browser associated with the client computer;
   responsive to detecting the transition from the first web page to the second web page, identifying a site that comprises the first web page and the second web page in a site list comprising a list of sites to be protected;
   detecting a security level associated with the transition from the first web page to the second web page;
   responsive to identifying the site in the site list, identifying an expected security level associated with the transition from the first web page to the second web page using the page list;
   determining whether the detected security level is lower than the identified expected security level; and
   responsive to the identified detected security level being lower than the identified expected security level, performing a remedial action.

10. The non-transitory computer-readable storage medium of claim 9, wherein the page list further comprises authentication data associated with a site in the site list, the method further comprising verifying that the page list came from an expected source by applying the authentication data to the page list.

11. The non-transitory computer-readable storage medium of claim 9, wherein establishing the page list comprises receiving a first page list from a first web site associated with the first web page and the second web page, and receiving a second page list from a second web site, wherein the first and second page lists comprise, for at least one transition from a source web page to a destination web page, an identifier of the source web page, an identifier of the destination web page, and an expected security level associated with the transition.

12. The non-transitory computer-readable storage medium of claim 9, the actions further comprising receiving the page list from a security server located at a remote location over a computer network.

13. The non-transitory computer-readable storage medium of claim 9, the actions further comprising:
   monitoring transitions between first and second web pages within the browser associated with the client computer;
   determining whether a first one of the transitions is associated with an increase in a security level of a browser session; and
   responsive to a determination that the first one of the transitions is associated with an increase in the security level, storing the first one of the transitions and a representation of the security level in the page list.

14. The non-transitory computer-readable storage medium of claim 13, the actions further comprising:
   providing the page list to a security server; and
   receiving, from the security server, an aggregated page list comprising contents of the page list and contents of page lists created on computers other than the client computer.

15. The non-transitory computer-readable storage medium of claim 9, wherein the remedial action comprises one of blocking access to the second web page, displaying an alert message referencing the detected and expected security levels, and logging an error message referencing the detected and expected security levels.

16. A computer-implemented system for detecting a possible network security breach occurring during a network interaction involving a client computer, comprising:
   a cache containing a page list comprising, for each of a plurality of transitions from a source web page to a destination web page, an identifier of the source web page, an identifier of the destination web page, and a representation of an expected security level associated with the transition;
   a security module performing actions comprising:
   detecting a transition from a first web page to a second web page within a browser associated with the client computer;
   responsive to detecting the transition from the first web page to the second web page, identifying a site that comprises the first web page and the second web page in a site list comprising a list of sites to be protected;
   detecting a security level associated with the transition from the first web page to the second web page;
   responsive to identifying the site in the site list, identifying an expected security level associated with the transition from the first web page to the second web page using the page list;
   determining whether the detected security level is lower than the identified expected security level; and
   responsive to the identified detected security level being lower than the identified expected security level, performing a remedial action.

17. The computer-implemented system of claim 16, the actions of the security module further comprising receiving the page list from a security server located at a remote location over a computer network.

18. The computer-implemented system of claim 16, the actions of the security module further comprising:
   monitoring transitions between first and second web pages within the browser associated with the client computer;
   determining whether a first one of the transitions is associated with an increase in a security level of a browser session; and
   responsive to a determination that the first one of the transitions is associated with an increase in the security level, storing the first one of the transitions and a representation of the security level in the page list.

19. The computer-implemented system of claim 18, the actions of the security module further comprising:
   providing the page list to a security server; and
   receiving, from the security server, an aggregated page list comprising contents of the page list and contents of page lists created on computers other than the client computer.

20. The computer-implemented system of claim 16, wherein the remedial action comprises one of blocking access to the second web page, displaying an alert message referencing the detected and expected security levels, and logging an error message referencing the detected and expected security levels.

* * * * *